United States Patent [19]

Kashio

[11] 4,034,209

[45] July 5, 1977

[54] RECORDING DEVICE

[75] Inventor: Toshio Kashio, Yamato, Japan

[73] Assignee: Casio Computer Co., Ltd., Tokyo, Japan

[22] Filed: July 12, 1974

[21] Appl. No.: 488,027

Related U.S. Application Data

[63] Continuation of Ser. No. 311,549, Dec. 4, 1972, abandoned.

[30] Foreign Application Priority Data

Dec. 8, 1971  Japan .............................. 46-99217

[52] U.S. Cl. ..................... 235/61.9 R; 235/61.8 R; 346/44; 235/61.11 E
[51] Int. Cl.² ..................... G06K 1/18; G06K 7/10; G01D 9/04
[58] Field of Search ................. 235/61.6 R, 61.9 R, 235/61.1, 61.11 E, 61.7 R, 61.6 J, 61.8 R; 340/172.5; 346/136, 146, 44; 197/19, 20; 101/45

[56] References Cited

UNITED STATES PATENTS

| 2,918,658 | 12/1959 | Hoberg | 340/172.5 |
| 3,297,992 | 1/1967 | McDonald | 340/172.5 |
| 3,353,163 | 11/1967 | Soule | 340/172.5 |
| 3,502,262 | 3/1970 | Ritzerfeld | 346/146 |
| 3,644,712 | 2/1972 | Goodrich | 235/61.8 R |
| 3,740,759 | 6/1973 | McKeegan | 346/44 |

Primary Examiner—Robert M. Kilgore
Attorney, Agent, or Firm—Flynn & Frishauf

[57] ABSTRACT

A code carried by a recording paper is read out and the code signal is supplied to a data processing control unit. The source data corresponding to this code signal is read out from a data memory unit under instructions from the data processing control unit. An arithmetic operation associated with the source data read out from the data memory unit is performed by the data processing control unit. The result obtained from the arithmetic operation is then recorded in the paper.

6 Claims, 1 Drawing Figure

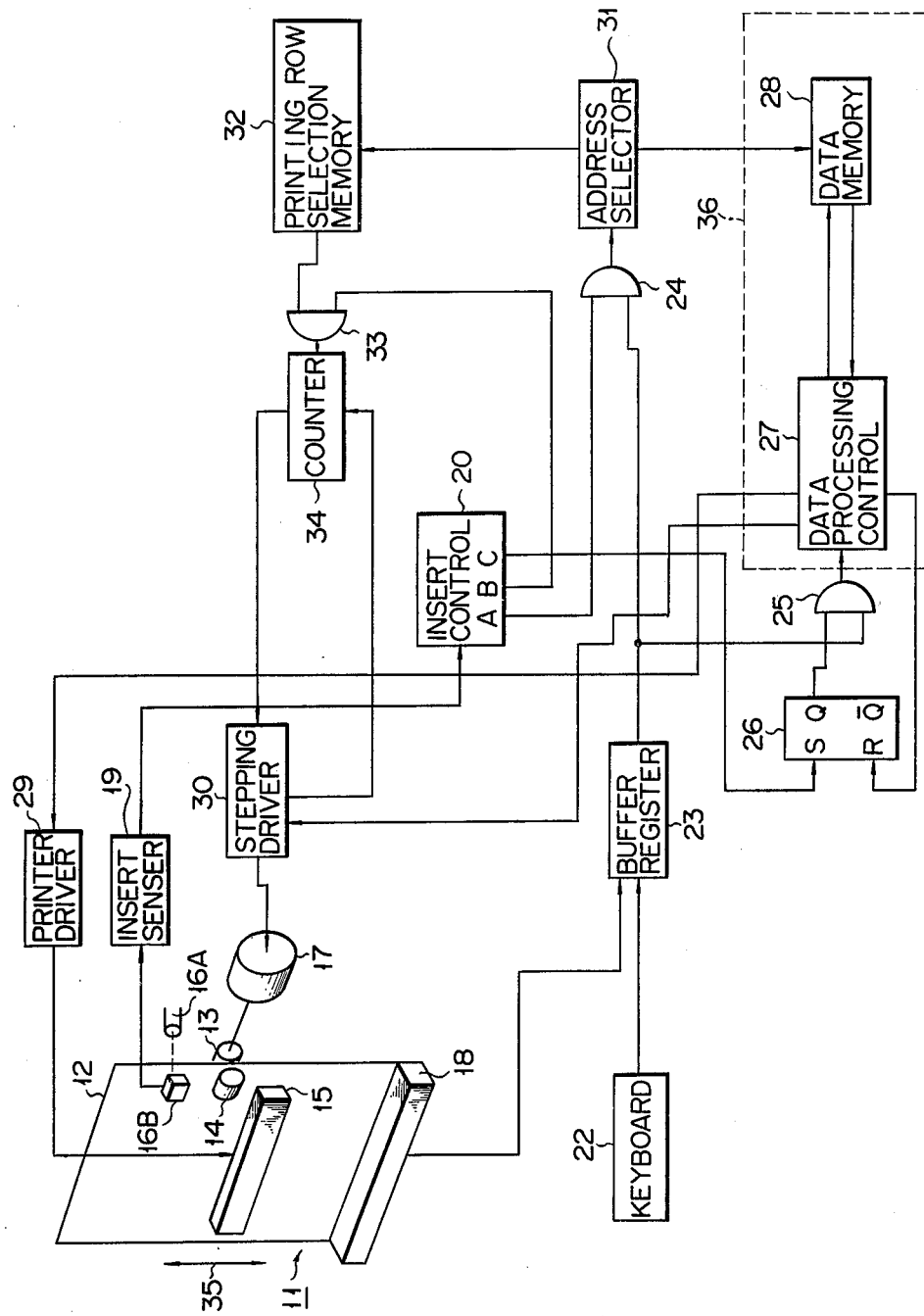

RECORDING DEVICE

This is a continuation of application Ser. No. 311,549, filed Dec. 4, 1972, now abandoned.

This invention relates to a recording device and more particularly to a device for recording a new data on the recording paper bearing its source data.

It is known that when a sheet of paper is used as a ledger, for example, a recording device has been employed to record on the ledger a new data having relationship with the contents, rows or columns already recorded on the ledger. This recording device, when used, is connected to an electronic computer, for instance. However, the conventional ledger is a "magnetic ledger" in which a magnetic recording section is formed on one side of the ledger in the longitudinal direction to magnetically record the contents already printed in the ledger and rows or columns of the record thereby automatically setting the ledger to a new printing section.

There are, however, many serious drawbacks to magnetically recording the data in the ledger. One serious drawback is that the ledger itself must be coated partially with a magnetic material or a magnetic recording tape must be attached to the ledger. This is extremely inconvenient to handle. Another drawback is that the magnetic recording section should always be kept in stable contact with the magnetic recording head of the recording device. When the ledger is placed on the recording section of the recorder, however, it is difficult to maintain this stable contact because of damage due to bending, curving or abrasion of the magnetic recording section of the ledger during the arrangement or treatment of the ledger. This is liable to cause too many accidents to ensure the practical application of this type of recorder.

Accordingly, an object of this invention is to provide an improved recording device capable of further printing on a recording paper having a source data a new data having a relationship with the source data without providing a magnetic recording section on the paper itself.

SUMMARY OF THE INVENTION

The recording device of this invention comprises means for reading out the code of a recording paper bearing a source data, a data processing control unit to which the code signal read out by this means is supplied, and a data memory unit for storing the source data of the paper to be read out therefrom corresponding to the code signal under instructions from the data processing control unit; the recording device performing an arithmetic operation connected with the source data contents read out from the data memory unit.

The paper handling can be made so much easier by providing a punch code to the recording paper. In the recording device of the invention, row selection data for selecting a row for starting to print on the paper may be stored in the memory unit. The paper may be automatically set so as to position the print starting row of the paper at the printing position using the row selection data read out from the memory unit by the read out code signal.

The FIGURE shows a block diagram illustrating a digital type embodiment of this invention.

In the FIGURE is shown a recording section 11 of the recording device of this invention, which comprises a roller 13 for guiding a sheet of recording paper 12 with a source data as a ledger to a predetermined position, a roller 14 which is rotated inversely with respect to the rotation of a roller 13 through the paper 12, a printing head 15 for printing data in the paper 12 and a light source 16A and a light receiver 16B mounted on either side of the paper 12 to sense the correct insertion of the paper 12. The roller 13 is driven by a motor 17 as described hereinafter. A punch code (not shown) is provided at the lower portion of the paper 12 to discriminate this particular paper. When the paper 12 is set to a predetermined position, the punch code is read out by a punch code read out device 18 to generate a code signal. A signal from the light receiver 16B is supplied to an insert sensing circuit 19 to sense the inserted state of the paper 12. The output signal from the insert sensing circuit 19 is applied to an insert control circuit 20 to produce control signals A, B and C.

A code signal from the punch code read out device 18 is fed to a buffer register 23 to be stored therein, which stores also a signal from a keyboard 22. Outputs from the buffer register 23 are supplied to AND circuits 24 and 25 respectively. The output signal C of the insert control circuit 20 is supplied to the set terminal S of a flip-flop circuit 26. A signal which is produced at the end of an arithmetic operation in the data processing control device 27 is supplied to the reset terminal R of the flip-flop circuit 26. An arithmetic operation device 36 includes the data processing control unit 27 together with a data memory unit 28. A set output Q of the flip-flop circuit 26 is fed to the AND circuit 25. The output signal from the AND circuit 25, which contains address data is supplied as an input signal to the data processing control unit 27. Upon receiving the AND gate 25 output, the data processing control unit 27 specifies an address in the memory unit 28 under a read-out instruction and reads out from the data memory unit 28 the data concerning the source data which corresponds to the code of the paper 12. This source data includes information concerning the record printed on the paper 12. The data processing control unit 27 performs an arithmetic operation associated with the source data read out from the data memory unit 28 (i.e., addition or subtraction), and a new data supplied via a keyboard 22 through the AND circuit 25 and supplies printing data to a printer driver 29 and at the same time gives a stepping control instruction to a stepping driver 30. After completion of the arithmetic operation, the data to be printed is supplied to the printing head 15 via the printing driver 29. Also, flip flop 26 is reset at the end of the arithmetic operation. The code signal of the paper 12 is delivered to an address selector 31 through the AND gate 24 to which a gate signal A is fed from the insert control circuit 20. The code signal corresponding to the paper 12 is converted in selector 31 to an address signal which is supplied to a printing row selection memory unit 32 and the data memory unit 28. Then the printing row selection memory unit 32 supplies a printing row selection signal to a stepping counter 34 through an AND gate 33 with the gate signal B from the insert control circuit 20. The printing row selection signal, i.e. the output from the gate 33 sets at the counter 34 the number of counts required for step driving the motor 17. The motor 17 is driven while counting up or down the counter 34 according to the set counts of the counter 34 through the stepping driver 30. Therefore, the paper 12 is brought to a printing row position where the writing head 15 is positioned by being moved by the motor 17 in one of the directions as shown by the arrows 35 in the FIGURE. After the time required to complete the setting of the paper at the printing row position, the gate signal C is generated and the signal is supplied from the insert control circuit 20 to the flip-flop circuit 26 to set the flip-flop circuit and to supply the set output signal Q to the gate circuit 25. When the code signal of the paper 12 stored in the buffer register 23 is supplied to the data processing control circuit 27 through the gate 25 the source data of the paper 12 stored in the memory unit 28, for example a first sum, is read out. The arithmetic operation device 36 including the data processing control unit 27 and the data memory unit 28 is operated corresponding to the source data of the paper 12 read out and to the new input data from the keyboard 22. The results obtained by the arithmetic operation are fed to the printer driver circuit 29 and the required printing is effected by the printing head 15 in the preset printing row position of the paper 12. At the same time, the printed information is stored in the data memory unit 28 as a new source data, for example a second sum. To change the printing row during the printing process, a step control instruction is given from the data processing control circuit 27 to the stepping driver circuit 30. The printed row selection memory unit 32 always stores the printed states of the paper 12 with its specified address. The storage is renewed by a signal from the data processing control circuit 27, depending upon progress in printing the new data on the paper 12.

As described above, the recorded contents of the paper 12 and the recorded states, for example, rows or columns, are always stored in the data memory unit 28 and the printing row selection memory unit 32. Therefore, the paper 12 is automatically set to the printing row position of the recording section of the recording device by merely coding the paper 12 itself and by inserting the coded paper 12 in the recording section. Thus, the operations concerning new data item from the keyboard 22 (or any other data item from a data source) and the source data of the paper 12 read out from the memory unit 28 are performed, resulting in on new recording in the paper 12.

The foregoing description refers to a punch code used to discriminate a particular paper 12. However, any other discriminating means may be used instead. For example, the recording device of this invention may be applied to automatic bowling score processing devices.

What is claimed is:

1. A recording device for recording a new data item on a recording paper adjacent an already printed row of data, and wherein said recording paper is removed from said recording device after said new data item is printed and then fed again into said recording device for recording another new data item, said recording device comprising:
paper driving means (13, 14, 17) for feeding to said recording device a recording paper (12) which carries a code distinguishing said recording paper from other recording papers;
means (18) for reading out the code carried by said recording paper (12);
storage means (28) having a plurality of addresses, each being assigned to an individual recording paper, for storing first data in, and reading data out from an address designated by said read out code, said first data corresponding to the data items already printed on said recording paper and the information indicating the printed row of said recording paper;
address designating means (31) coupled to said storage means (28) and to said read out means (18) for designating an address of said storage means (28) corresponding to said read out code;
means (32) coupled to said address designating means (31) for reading out from the address designated by said address designating means (31) said information indicating the printed row, so that the printed row can be read out when the recording paper is fed again into the recording device;
control means (30, 33, 34) coupled to said paper driving means (13, 14, 17) for controlling said paper driving means (13, 14, 17) in accordance with said information read out from said storage means (28) so as to set said recording paper (12) at a new printing position corresponding to a row in which said new data item is to be printed;
said storage means including means for reading out said first data from the address designated by said address designating means (31);
data input means (22, 23) for supplying input data items;
arithmetic operation means (27) coupled to said storage means and to said data input means for receiving an input data item and for obtaining second data which is the sum of said first data read out from said storage means (28) and an input data item;
means (29) coupled to said arithmetic operation means (27) for printing said second data obtained by said arithmetic operation means at said new printing position on said recording paper; and
means (27) for writing in the designated address of said storage means (28) said second data and the information indicating the row in which the second data is printed.

2. A recording device according to claim 1 wherein said first data stored in said designated address of said storage means is a "balance" of data item printed on said recording paper and a predetermined data item.

3. A recording device according to claim 1 wherein said code on said recording paper is a punched code.

4. A recording device according to claim 1 wherein said control means (30, 33, 34) includes a counter (34) in which said information indicating said printed row read out from said storage means (28) is set in the form of counts, and a motor (30) which feeds said recording paper (11) according to a row in which said data item is to be printed.

5. A recording device comprising:
means for reading out the code of a recording paper bearing a source data and for reading out the source data;
a data processing control unit coupled to said reading out means for receiving the code signal read out by said reading out means and for generating an instruction responsive to said code signal;
data memory means coupled to said data processing control unit for storing a source data of said recording paper and a row selection data for selecting a row of said recording paper at which a new recording is to start, said source data and row selection data being read out from the data memory means under said instructions from said data processing control unit when the data processing control unit is supplied with said code signal;

means coupled to said data memory means for moving and setting said paper to a given printing position for said new recording which is a function of the row selection data read out from said data memory means; and means for storing in said data memory means a new row selection data corresponding to said given printing position to properly locate said recording paper for the next subsequent recording.

6. A recording device according to claim 5 wherein said means for moving and setting said recording paper includes a counter responsive to said row selection data and in which the number of counts is set by said row selection data; and a motor coupled to said counter and driven according to the set counts of said counter for moving said recording paper to said given printing position.

* * * * *

UNITED STATES PATENT AND TRADEMARK OFFICE
CERTIFICATE OF CORRECTION

PATENT NO. : 4,034,209
DATED : July 5, 1977
INVENTOR(S) : Toshio KASHIO

It is certified that error appears in the above-identified patent and that said Letters Patent are hereby corrected as shown below:

On the initial page of the printed patent, after the inventor's name, Toshio Kashio, change "Yamato" to --Tokyo--;

Column 4, line 52, after "according to" insert --said counts to a printing position corresponding to--.

Signed and Sealed this

Eighth Day of November 1977

[SEAL]

Attest:

RUTH C. MASON
Attesting Officer

LUTRELLE F. PARKER
Acting Commissioner of Patents and Trademarks